US008595905B1

(12) United States Patent
Kirk et al.

(10) Patent No.: US 8,595,905 B1
(45) Date of Patent: Dec. 3, 2013

(54) DRAW PULL FOR BLIND

(76) Inventors: James Kirk, Keller, TX (US); Barbara Kirk, Keller, TX (US)

( * ) Notice: Subject to any disclaimer, the term of this patent is extended or adjusted under 35 U.S.C. 154(b) by 154 days.

(21) Appl. No.: 12/986,154

(22) Filed: Jan. 6, 2011

(51) Int. Cl.
*F16G 11/00* (2006.01)

(52) U.S. Cl.
USPC .......................... 24/128; 24/303; 160/178.1 R

(58) Field of Classification Search
USPC ................ 24/115 F, 115 R, 128, 116 A, 303; 160/178.1 R
See application file for complete search history.

(56) References Cited

U.S. PATENT DOCUMENTS

| | | | | | |
|---|---|---|---|---|---|
| 75,750 | A | | 3/1868 | Gridley | |
| 153,382 | A | | 7/1874 | Scranton | |
| 387,499 | A | | 8/1888 | Earnshaw | |
| 519,148 | A | | 5/1894 | Crampton | |
| 520,318 | A | | 5/1894 | Knap | |
| 626,374 | A | | 6/1899 | Fisher | |
| 819,064 | A | | 5/1906 | Hartshorn | |
| 1,820,328 | A | | 8/1931 | Schlegel | |
| 4,955,750 | A | * | 9/1990 | Goran | 403/306 |
| D364,984 | S | | 12/1995 | Voss | |
| 5,504,977 | A | * | 4/1996 | Weppner et al. | 24/115 R |
| 5,560,414 | A | * | 10/1996 | Judkins et al. | 160/178.1 R |
| 5,579,819 | A | * | 12/1996 | Hung et al. | 160/178.1 R |
| 5,634,244 | A | * | 6/1997 | Fetsch et al. | 24/115 F |
| 5,769,142 | A | | 6/1998 | Nicolosi | |
| 5,823,242 | A | | 10/1998 | Huang | |
| 5,919,542 | A | * | 7/1999 | Chou | 428/99 |
| 6,044,523 | A | * | 4/2000 | Ortega | 16/442 |
| 6,066,371 | A | | 5/2000 | Zehetner | |
| 6,135,188 | A | | 10/2000 | Anderson et al. | |
| 6,260,241 | B1 | * | 7/2001 | Brennan | 24/135 R |
| 6,640,870 | B2 | * | 11/2003 | Osinga | 160/178.1 R |
| 7,281,564 | B2 | | 10/2007 | Dekker | |
| 7,337,824 | B2 | | 3/2008 | Berger | |
| 7,383,871 | B2 | * | 6/2008 | Osinga | 160/178.1 R |
| 8,104,146 | B2 | * | 1/2012 | Wen | 24/115 F |
| 8,132,299 | B2 | * | 3/2012 | Zhang | 24/115 F |
| 2004/0123958 | A1 | | 7/2004 | Krug | |
| 2004/0256063 | A1 | | 12/2004 | Schartner | |
| 2005/0045282 | A1 | | 3/2005 | Dekker | |
| 2005/0087312 | A1 | | 4/2005 | Nien | |
| 2005/0161171 | A1 | | 7/2005 | Corey | |
| 2010/0115735 | A1 | * | 5/2010 | Manvel | 24/116 A |

* cited by examiner

*Primary Examiner* — Robert J Sandy
*Assistant Examiner* — Louis Mercado
(74) *Attorney, Agent, or Firm* — QuickPatents; Kevin Prince

(57) ABSTRACT

A blind pull for a blind cord, such as is used on window blinds of various types, is disclosed. A weight has a central bore therethrough and is adapted for receiving the blind cord. A pair of mating shells is adapted to enclose the weight and a portion of the blind cord. Each shell has a recessed portion for receiving one-half of the weight therein. Each shell has a groove adapted for receiving one-half of the portion of blind cord. Each shell further includes mechanical fasteners such that the pair of shells may be held onto the weight thereby. In use, with the blind cord captured by the central bore of the weight, the pair of shells may be fitted around the weight and the blind cord and held thereto with the attachment means. The blind pull may then be pulled to actuate the blinds in a normal fashion. The shells may be interchanged with alternate shells, for example, alternate shells that take the form of a holiday theme, or the like.

19 Claims, 4 Drawing Sheets

DRAW PULL FOR BLIND

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to window coverings, and more particularly to an improved window blind pull.

DISCUSSION OF RELATED ART

Blind pulls for window blinds, such as vertical blinds, mini-blinds, or the like, commonly comprise a blind cord with a plastic cone fixed at the end thereof and secured by a knot in the blind cord. Such common blind pulls, while inexpensive, are bland, common, and pulls tend to be relatively light-weight and subject to considerably swaying in a breeze, for example, which is indicative of light-weight parts of low quality.

Several prior art devices aim to provide a more decorative blind pull than the standard plastic blind pulls. For example, U.S. Pat. No. 626,374 to Fisher on Jun. 6, 1899, teaches a more decorative blind pull. However, to remove such a device the knot on the end of the blind cord must be untied, which can be difficult and time consuming to accomplish particularly after repeatedly pulling down on such a blind pull and tightening the knot.

U.S. Pat. No. 1,820,328 to Schlegel on Aug. 25, 1931 teaches a device having at least one part that is fixed with the blind cord and that is interchangeable with another part. Such a device, however, cannot be completely interchanged with a new decorative element if desired. Rather, the entire device must be removed.

US Patent Application to Schartner on Dec. 23, 2004, teaches a blind cord pull and take-up reel. Such a device is well suited for adjusting the length of the blind cord, but not well-suited for improving the decorative appearance of the blind pull. Further, such a device is significantly bulky and unsightly.

U.S. Pat. No. 7,281,564 to Dekker on Oct. 16, 2007, teaches a blind pull with an interchangeable weight element. Such a device allows for interchanging only a base portion of the visible blind pull with alternate base portions, and a base portion of such a device is somewhat difficult to separate from the weight portion. Further, the interchangeable weight portion of such a device necessarily contains the weight, making each different interchangeable weight portion relatively expensive.

Therefore, there is a need for a device that efficiently adds weight to the blind pull, yet also allows the entire visible structure of the blind pull to be inexpensively and easily interchanged with alternate blind pulls of differing décor, themes, or the like, as desired. Such a needed invention would be easy to install on existing blind cords, and would be relatively inexpensive to manufacture. The present invention accomplishes these objectives.

SUMMARY OF THE INVENTION

The present device is a blind pull for a blind cord, such as is used on window blinds of various types. A weight has a central bore therethrough and is adapted for receiving the blind cord. The central bore preferably includes a tapered countersink at each end thereof for facilitating the threading of the blind cord therethrough and for receiving a knot tied in the blind cord. A pair of mating shells is adapted to enclose the weight and a portion of the blind cord. The weight portion is of a standardized shape and size configuration. Each shell has a recessed portion for receiving one-half of the weight therein. Each shell has a groove adapted for receiving one-half of the portion of blind cord. The recessed portions within each shell are also of a standardized size and shape.

Each shell further includes an attachment means that preferably includes mutually-attracting magnets in each shell, such that the pair of shells may be held mutually onto the weight by magnetic attraction. In another embodiment, the attachment means includes mutually-interlocking portions in each shell, such that the pair of shells are held mutually onto the weight by friction. The attachment means, in an alternate embodiment, may include hook-and-loop type fasteners on each shell, or on each shell and the weight, such that the pair of shells are held onto the weight thereby.

In use, with the blind cord captured by the central bore of the weight, the pair of shells may be fitted around the weight and the blind cord and held thereto with the attachment means. The blind pull may then be pulled to actuate the blinds in a normal fashion. The shells may be interchanged with alternate shells, for example, alternate shells that take the form of a holiday theme, or the like.

The present invention is a device that efficiently adds weight to a blind pull, yet also allows the entire visible structure of the blind pull to be inexpensively and easily interchanged with alternate blind pulls of differing décor, themes, or the like, as desired. The present invention is easy to install on existing blind cords, and is relatively inexpensive to manufacture. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
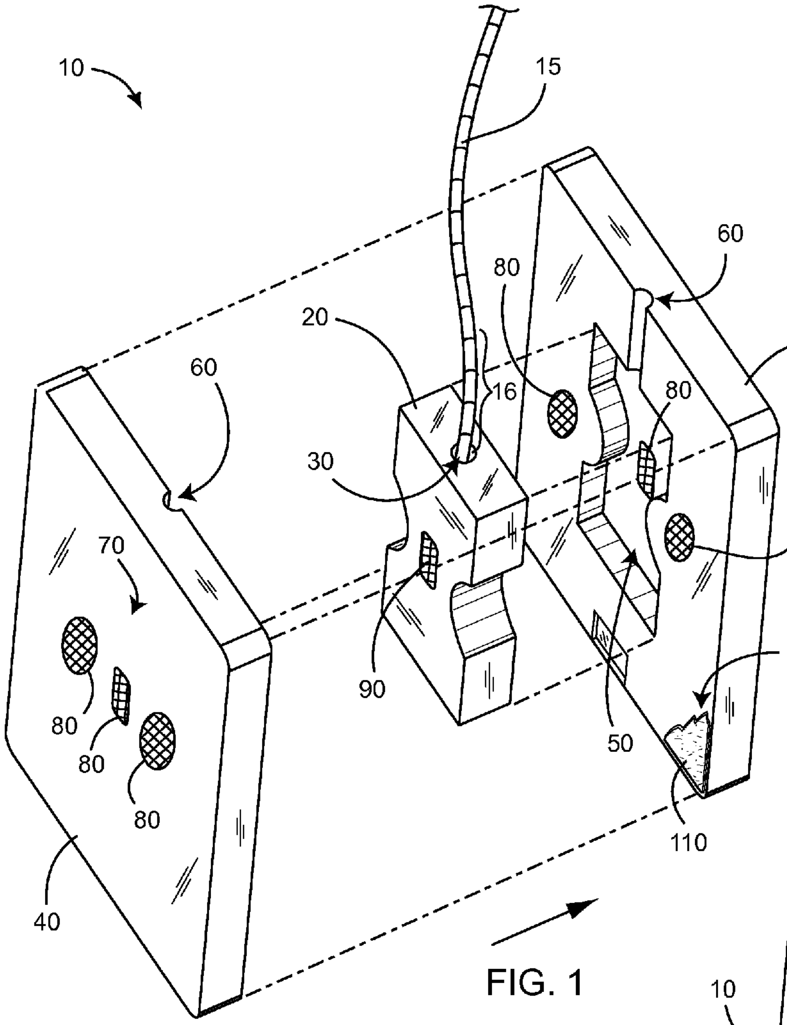
FIG. 1 is an exploded perspective view of the invention.
Figure 2:
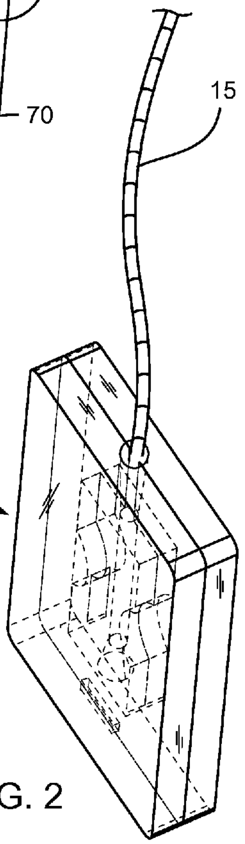
FIG. 2 is a non-exploded perspective view of FIG. 1.
Figure 3:
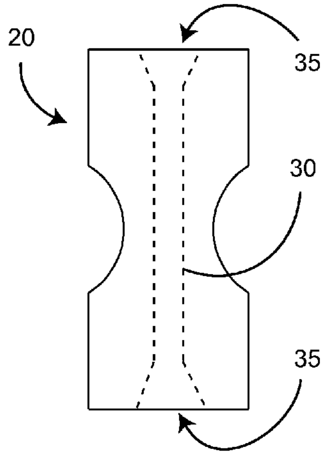
FIG. 3 is a front elevational view of a weight of the invention.
Figure 4:
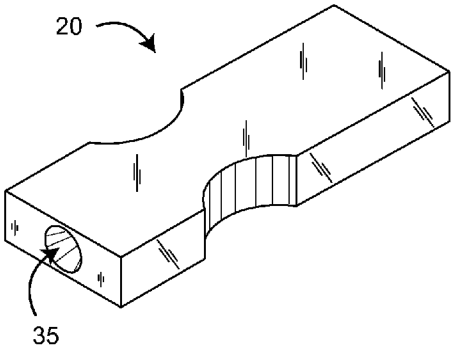
FIG. 4 is a perspective view of an alternate embodiment of the weight of the invention.
Figure 5:
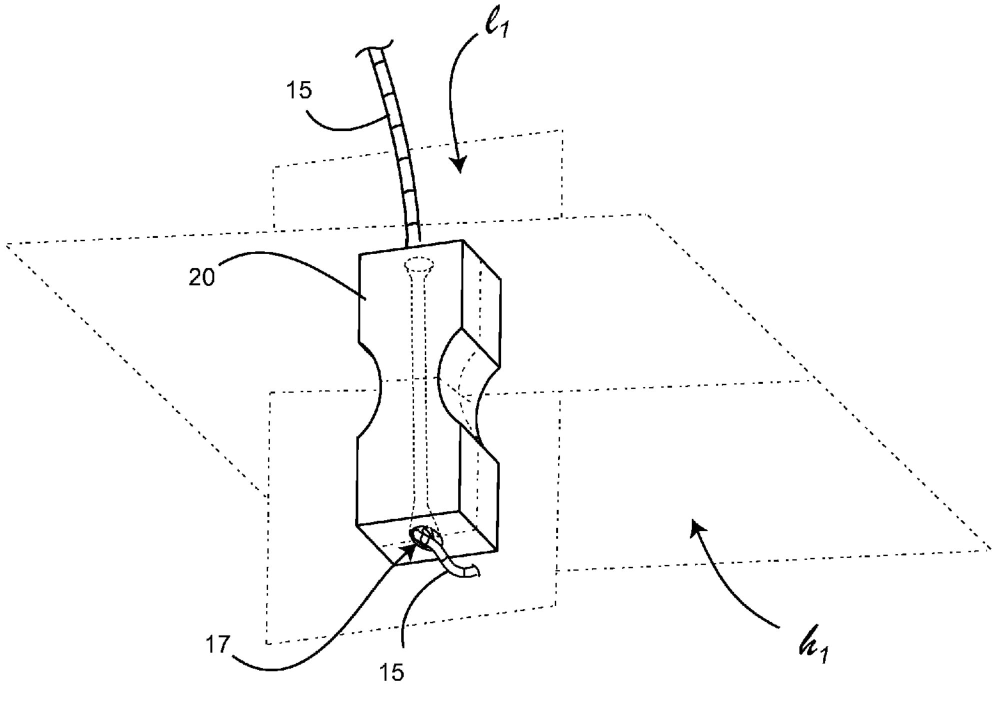
FIG. 5 is a perspective view of the weight as attached to a blind cord.
Figure 6:
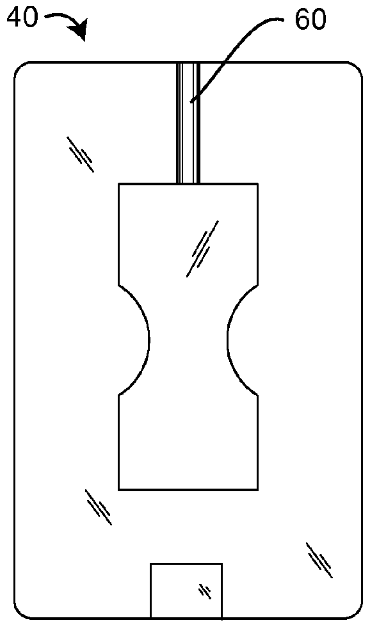
FIG. 6 is a front elevational view of a shell of the invention.
Figure 7:
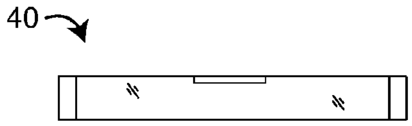
FIG. 7 is a side elevational view of the shell of FIG. 6.

FIGS. 1 and 2 illustrate a blind pull 10 for a blind cord 15, such as is used on window blinds (not shown) of various types. A weight 20 has a central bore 30 therethrough and is adapted for receiving the blind cord 15. The weight 20 is symmetric about a longitudinal plane $L_1$ (FIG. 5). The central bore 30 preferably includes a tapered countersink 35 at each end thereof (FIGS. 3 and 4) for facilitating the threading of the blind cord 15 therethrough and for receiving a knot 17 tied in the blind cord 15. Preferably the weight is made of a relatively heavy metal material, or a plastic enclosure for a relatively heavy metal material.

Figure 8:
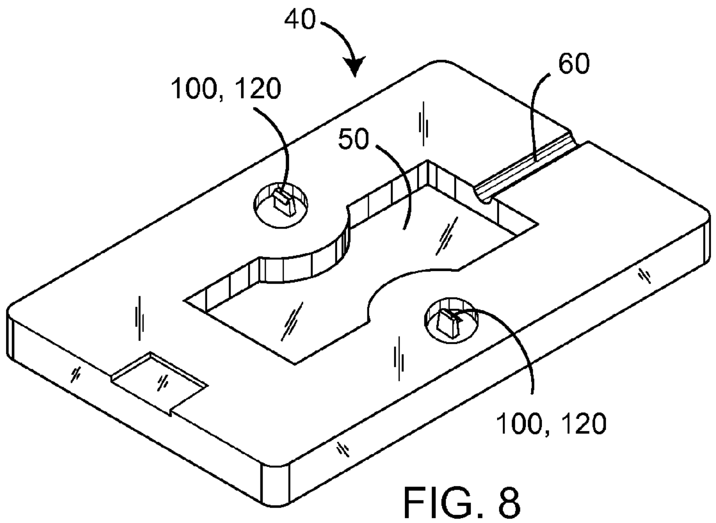
FIG. 8 is a perspective view of an alternate embodiment of the shell.

A pair of mating shells 40 is adapted to enclose the weight 20 and a portion 16 of the blind cord 15 (FIGS. 1 and 8). Each shell 40 has a recessed portion 50 for receiving substantially one-half of the weight 20 therein. Each shell 40 has a groove 60 adapted for receiving substantially one-half of the blind cord 15. The weight 20 may also be asymmetric (FIG. 4) about a horizontal plane $H_1$ (FIG. 5) therethrough, such that each shell 40 may be fitted about the weight 20 only in one direction. Alternately, the weight 20 may be symmetric (FIG. 3) about the horizontal plane $H_1$, such that each shell 40 may be fitted about the weight 20 in either of two directions.

Figure 9:
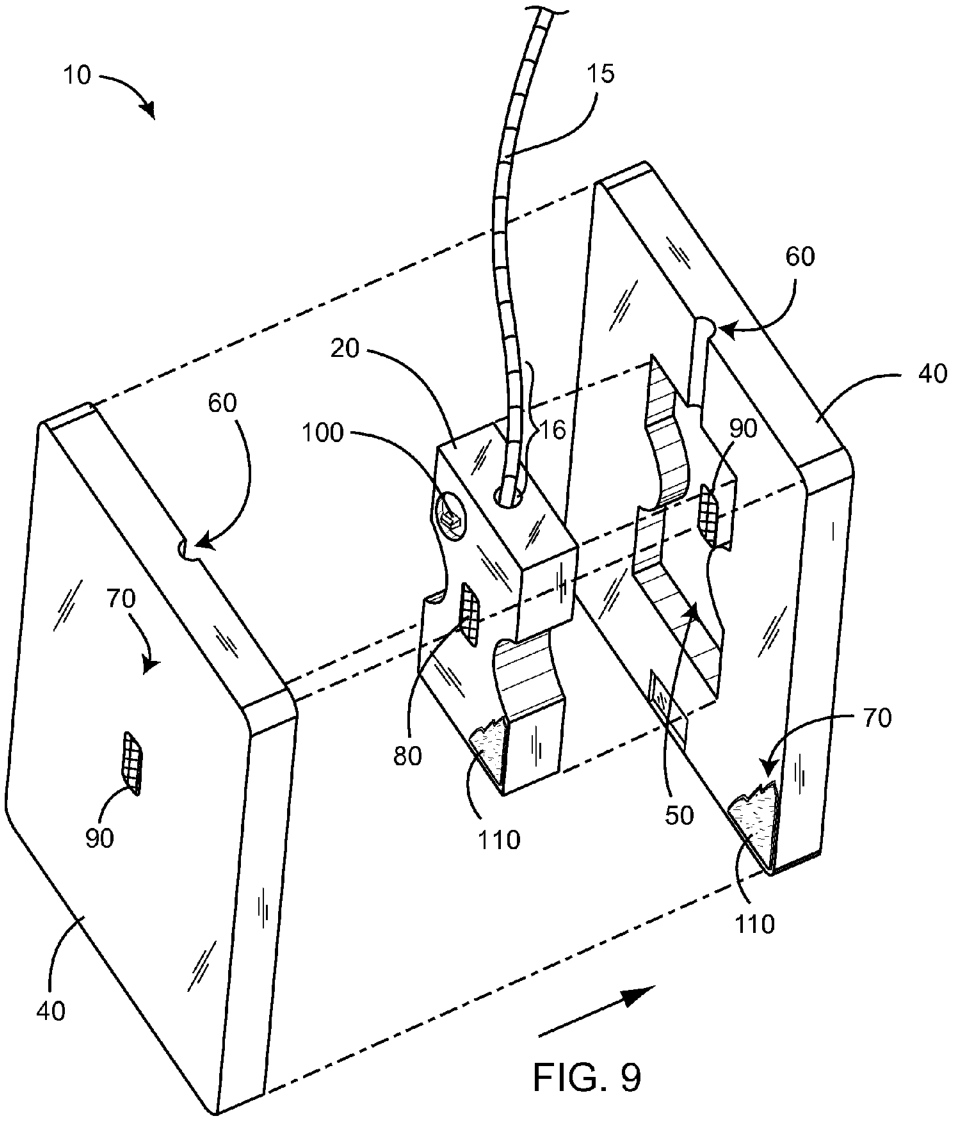
FIG. 9 is an exploded perspective view of an alternate embodiment of the weight.

Each shell 40 further includes an attachment means 70 that preferably includes mutually-attracting magnets 80 in each shell 40, such that the pair of shells 40 may be held mutually onto the weight 20 by magnetic attraction. Alternately, the attachment means 70 includes at least one of the magnets 80 in each shell and at least one magnetically attractive metal portion 90 in the weight 20 (FIG. 1). As such, the pair of shells 40 are held onto the weight 20 by magnetic attraction. In another alternate embodiment, the attachment means 70 includes at least one of the magnetically attractive metal portions 90 in each shell 40 and at least one of the magnets 80 in the weight 20, such that the pair of shells 40 are held onto the weight 20 by magnetic attraction (FIG. 9). The attachment means 70 may also be a mechanical fastener, such as a screw or the like (not shown).

In yet another alternate embodiment, the attachment means 70 includes mutually-interlocking portions 100 (FIG. 8) in each shell 40, such that the pair of shells 40 are held mutually onto the weight by friction. Each interlocking portion 100 may also be included on the weight 20, such that each shell 40 is held by friction to the weight 20 directly (FIG. 9). Each interlocking portion 100 may include a detent 120 such that tactile or audible feedback is provided when the shells 40 become fully mutually interlocked. Preferably each shell 40 is identical, such that a single plastic injection mold may be utilized to produce each shell 40.

The attachment means 70, in yet another alternate embodiment, may include hook-and-loop type fasteners 110 (FIG. 1) on each shell 40, such that the pair of shells 40 are held mutually onto the weight 20 thereby. Clearly such hook-and-loop type fasteners 110 may alternately be included on both the weight 20 and each shell 40 (FIG. 9) so that each shell 40 is held onto the weight thereby.

In use, with the blind cord 15 captured by the central bore 30 of the weight 20, the pair of shells 40 may be fitted around the weight 20 and the blind cord 15 and held thereto with the attachment means 70. The blind pull 10 may then be pulled to actuate the blinds in a normal fashion. The shells 40 may be interchanged with alternate shells 40, for example, alternate shells 40 that take the form of a holiday theme, or the like.

While a particular form of the invention has been illustrated and described, it will be apparent that various modifications can be made without departing from the spirit and scope of the invention. For example, each pair of shells 40 may be formed in the shape of an animal, object, or other form apart from the regular symmetric shape illustrated. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A blind pull for a blind cord, comprising:

a weight having a central bore therethrough adapted for receiving the blind cord, the weight being symmetric about a longitudinal plane;

a pair of mating shells adapted to enclose the weight and a portion of the blind cord, each shell having a recessed portion for receiving substantially one-half of the weight therein, each shell having a groove adapted for receiving substantially one-half of the blind cord, and each shell having an attachment means, the attachment means including at least one magnetically attractive metal portion in each shell and at least one magnet in the weight;

whereby with the blind cord captured by the central bore of the weight, the pair of shells may be fitted around the weight and the blind cord and held.

2. The blind pull of claim 1 wherein the central bore includes a tapered countersink at each end thereof for facilitating the threading of the blind cord therethrough and for receiving a knot tied in the blind cord.

3. The blind pull of claim 1 wherein each shell is substantially identical, whereby a single mold may be utilized to produce each shell.

4. The blind pull of claim 1 wherein the weight is asymmetric about a horizontal plane therethrough, such that each shell may be fitted about the weight in only one direction.

5. The blind pull of claim 1 wherein the weight is symmetric about a horizontal plane therethrough, such that each shell may be fitted about the weight in either of two directions.

6. A blind pull for a blind cord, comprising:

a weight having a central bore therethrough adapted for receiving the blind cord, the weight being symmetric about a longitudinal plane, the central bore including a tapered countersink at each end thereof for facilitating the threading of the blind cord therethrough and for receiving a knot tied in the blind cord;

a pair of mating shells adapted to enclose the weight and a portion of the blind cord, each shell having a recessed portion for receiving substantially one-half of the weight therein, each shell having a groove adapted for receiving substantially one-half of the blind cord, and each shell having an attachment means that includes interlocking portions in each shell and the weight;

whereby with the blind cord captured by the central bore of the weight, the pair of shells may be fitted around the weight and the blind cord and held thereto by friction.

7. The blind pull of claim 6 wherein each shell is substantially identical, whereby a single mold may be utilized to produce each shell.

8. The blind pull of claim 6 wherein the weight is asymmetric about a horizontal plane therethrough, such that each shell may be fitted about the weight in only one direction.

9. The blind pull of claim 6 wherein the weight is symmetric about a horizontal plane therethrough, such that each shell may be fitted about the weight in either of two directions.

10. A blind pull for a blind cord, comprising:

a weight having a central bore therethrough adapted for receiving the blind cord, the weight being symmetric about a longitudinal plane;

a pair of mating shells adapted to enclose the weight and a portion of the blind cord, each shell having a recessed portion for receiving substantially one-half of the weight therein, each shell having a groove adapted for receiving substantially one-half of the blind cord, and each shell having an attachment means that includes a hook-and-loop type fastener on each shell;

whereby with the blind cord captured by the central bore of the weight, the pair of shells may be fitted around the weight and the blind cord and held thereto by the hook-and-loop type fastener.

11. The blind pull of claim 10 wherein the central bore includes a tapered countersink at each end thereof for facilitating the threading of the blind cord therethrough and for receiving a knot tied in the blind cord.

12. The blind pull of claim 10 wherein each shell is substantially identical, whereby a single mold may be utilized to produce each shell.

13. The blind pull of claim 10 wherein the weight is asymmetric about a horizontal plane therethrough, such that each shell may be fitted about the weight in only one direction.

14. The blind pull of claim 10 wherein the weight is symmetric about a horizontal plane therethrough, such that each shell may be fitted about the weight in either of two directions.

15. A blind pull for a blind cord, comprising:

a weight having a central bore therethrough adapted for receiving the blind cord, the weight being symmetric about a longitudinal plane;

a pair of mating shells adapted to enclose the weight and a portion of the blind cord, each shell having a recessed portion for receiving substantially one-half of the weight therein, each shell having a groove adapted for receiving substantially one-half of the blind cord, and each shell having an attachment means that includes a hook-and-loop type fastener on the shell and the weight;

whereby with the blind cord captured by the central bore of the weight, the pair of shells may be fitted around the weight and the blind cord and held thereto with by the hook-and-loop type fastener.

16. The blind pull of claim 15 wherein the central bore includes a tapered countersink at each end thereof for facilitating the threading of the blind cord therethrough and for receiving a knot tied in the blind cord.

17. The blind pull of claim 15 wherein each shell is substantially identical, whereby a single mold may be utilized to produce each shell.

18. The blind pull of claim 15 wherein the weight is asymmetric about a horizontal plane therethrough, such that each shell may be fitted about the weight in only one direction.

19. The blind pull of claim 15 wherein the weight is symmetric about a horizontal plane therethrough, such that each shell may be fitted about the weight in either of two directions.

* * * * *